United States Patent [19]
Joesting

[11] 3,769,995
[45] Nov. 6, 1973

[54] DIAPHRAGM LOGIC SWITCHING CIRCUIT

[75] Inventor: Frederick D. Joesting, Park Ridge, Ill.

[73] Assignee: Honeywell Inc., Minneapolis, Minn.

[22] Filed: Sept. 15, 1971

[21] Appl. No.: 180,800

[52] U.S. Cl. .......... 137/829, 235/201 ME
[51] Int. Cl. .......... F15c 3/04
[58] Field of Search .......... 137/608, 81.5; 235/201 ME

[56] References Cited

UNITED STATES PATENTS

| | | | |
|---|---|---|---|
| 3,540,477 | 11/1970 | Hogel | 235/201 ME |
| 3,335,950 | 8/1967 | Tal et al. | 235/201 ME |
| 3,318,329 | 5/1967 | Norwood | 137/608 X |
| 3,433,257 | 3/1969 | Jensen | 235/201 ME |
| 3,500,853 | 3/1970 | Freeman | 137/608 X |
| 3,610,274 | 10/1971 | Levesgue et al. | 137/608 X |

OTHER PUBLICATIONS

"Exclusive OR Logic Circuit Using Diaphragm Elements," D. F. Jensen, I.B.M. Tech. Discl. Bull. Vol. 7, No. 3, Aug. 1964 pp. 216, 217.

*Primary Examiner*—Samuel Scott
*Attorney*—Lamont B. Koontz et al.

[57] ABSTRACT

A diaphragm logic switching circuit with adjustable switching points for direct acting or reverse acting switching between zero and a branch pressure input signal or between zero and a main pressure input signal.

10 Claims, 8 Drawing Figures

INVENTOR.
FREDERICK D. JOESTING
BY
[signature]
ATTORNEY.

INVENTOR.
FREDERICK D. JOESTING
BY [signature]
ATTORNEY.

DIAPHRAGM LOGIC SWITCHING CIRCUIT

BACKGROUND AND SUMMARY OF THE INVENTION

This invention relates to a pneumatic diaphragm logic switching circuit and more particularly to a switching circuit with adjustable setpoints for controlling a pressure-to-electric (P-E) switch or the like.

P-E switches typically have an adjustable cut-in or cur-out point and an adjustable differential. The differential is either added to or subtracted from the cut-in or cut-out point to establish the second switching point. These adjustments of the cut-in or cut-out point and differential must usually be made at the P-E switch itself. The subject invention allows the independent adjustment of both the cut-in and cut-out points and allows these adjustments to be made at some point remote from the P-E switch itself. In addition, it allows the use of a relatively low cost P-E switch with a fixed cut-in or cut-out and a fixed differential.

The switching circuit of the subject invention may be arranged to provide direct action switching where the output pressure switches from zero to the input pressure upon an increase in the input pressure, or reverse action switching where the output pressure switches from the input pressure to zero upon an increase in the input pressure. The switching circuit may be used for switching step controllers, switching-over in day-night or summer-winter control systems, and other cases where either pneumatic or electric switching is needed from a pneumatic input.

In its simplest form the switching circuit comprises two diaphragm logic modules each having adjustable biasing springs urging the diaphragm modules towards closed positions. The arrangement of two diaphragm logic modules provides direct acting switching with a graduated output. By adding a third diaphragm logic module either reverse acting switching of the branch pressure input may be obtained or direct acting switching of a main pressure input may be obtained. By adding a fourth diaphragm logic module reverse acting switching of a main pressure input may be obtained.

DETAILED DESCRIPTION OF THE INVENTION

Figure 1:
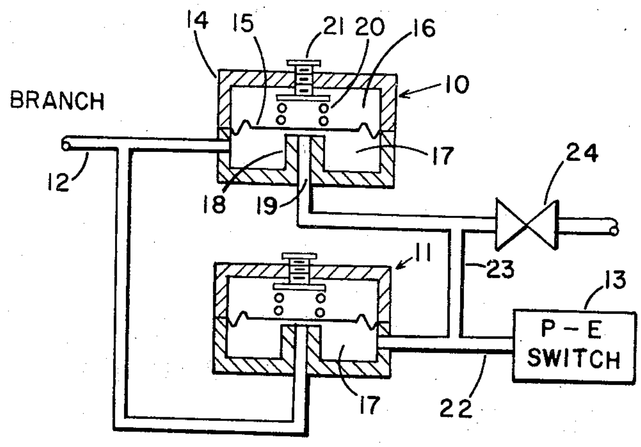
FIG. 1 is a schematic illustration of the switching circuit arranged to provide direct acting switching of the branch pressure input.
Figure 1A:
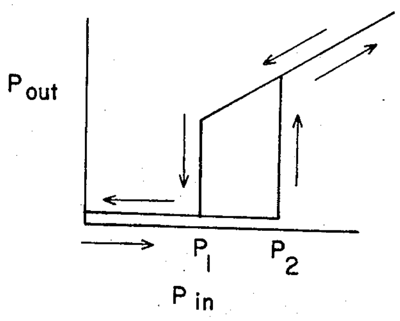
FIG. 1*a* is a graph showing the relationship between the branch pressure input and the pressure output of the switching circuit of FIG. 1.

FIG. 1 is a schematic illustration showing two diaphragm logic modules or valve means 10 and 11 connected to provide direct acting switching of the branch pressure input at 12. The output of the circuit in FIG. 1 is transmitted through outlet 22 to a P-E switch 13. The relationship between the output pressure at 22 and the input pressure at 12 is shown in FIG. 1*a*.

Each of the valve means 10 and 11 is comprised of a housing means 14 and a diaphragm means 15 dividing the housing means into a control chamber 16 and a flow chamber 17. Disposed within the flow chamber 17 is an annular partition 18 which is arranged to cooperate with the diaphragm means 15 in a sealable relation to further define a valving chamber or nozzle 19.

Figure 2:
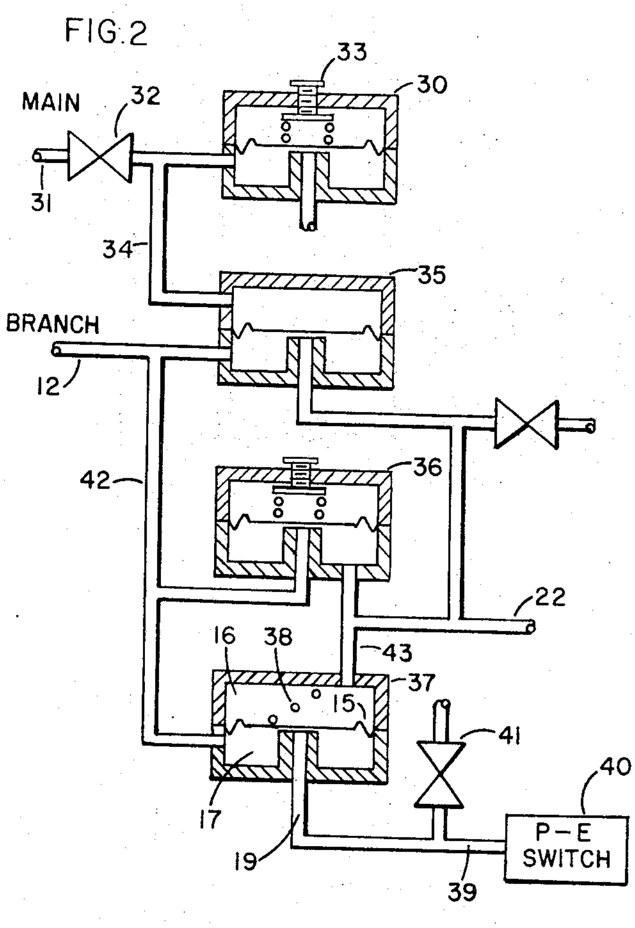
FIG. 2 is a schematic illustration of the switching circuit arranged to provide reverse acting switching of the branch pressure input.

Associated with the control chamber 16 is a biasing means which is comprised of a spring 20 and a threaded member 21 arranged to allow the force exerted by the spring on the diaphragm means 15 to be selectively varied. The biasing force exerted on the diaphragm means 15 by the spring 20 may also be provided by air pressure by means of a PRV 30 as shown in FIG. 2. The PRV 30 is connected to a source of main pressure at inlet 31 through a restriction 32. The PRV 30 is adjusted by means 33 to establish a desired pressure in a conduit 34 which is transmitted to the control chamber of valve means 35. Thus the PRV 30 provies the same biasing function as does the biasing spring 20 in FIG. 1.

The branch pressure inlet 12 is connected to the flow chamber 17 of valve means 10 and valving chamber or nozzle 19 of valve means 11. The pressure outlet 22 is connected to the valving chamber or nozzle 19 of valve means 10 and to the flow chamber 17 of valve means 11. In addition there is connected to the valving chamber 19 of valve means 10 a restricted bleed 24.

In operation valve means 10 of the switching circuit in FIG. 1 is adjusted to remain closed until the branch pressure is the flow chamber 17 reaches a desired level such as P2. The valve means 11 is adjusted to remain closed until the pressure in the flow chamber 17 reaches a value somewhat less than P2, say P1. When the branch pressure is less than either P1 or P2, the output pressure at 22 of the switching circuit is zero. When the branch pressure input reaches P2, valve means 10 opens and the branch pressure is immediately transmitted to the outlet 22 and thus to P-E switch 13. The branch pressure is also transmitted through conduit 23 to the flow chamber 17 of valve means 11 thereby causing valve means 11 to open. Thus, when the branch pressure is in excess of P2, valve means 10 and 11 are both open and the output pressure is equal to the branch pressure input.

When the branch pressure falls below P2, valve means 10 closes but valve means 11 remains open since the pressure in flow chamber 17 of valve means 11 is still in excess of the pressure at which valve means 11 is adjusted to close. When the branch pressure decreases to P1, valve means 11 immediately closes thereby cutting off communication between the branch pressure input 12 and the outlet 22. The pressure in conduit 23 thereupon bleeds down to atmospheric pressure through restricted bleed means 24.

The valve means 10 and 11 may be adjusted to provide any desired combination of switching points. The minimum differential of the switching circuit is limited only by the inherent differential of valve means 10.

FIG. 2 is a schematic illustration of a switching circuit arranged to provide reverse acting switching of the branch pressure input at 12. Valve means 35 and 36 of FIG. 2 are essentially the same as valve means 10 and 11 in FIG. 1 with the exception that a PRV 30 is used in place of the biasing spring 20 as described above. The switching circuit of FIG. 2 is essentially the switching circuit illustrated in FIG. 1 with one diaphragm logic module or valve means 37 added to provide a reverse acting switching function of the branch pressure input. The outlet 22 is adapted to provide the first pressure output whose relationship to the branch pressure input is shown in FIG. 1a. The outlet 22 may or may not be utilized in the circuit of FIG. 2, but if it is not, the outlet 22 should be plugged.

The control chamber of valve means 37 is connected to flow chamber of valve means 36. The flow chamber of valve means 37 is connected to the branch pressure input 12. Disposed within the control chamber 16 of valve means 37 is a light closing spring 38 which simply provides a slight force on the diaphragm means 15 to maintain valve means 37 closed when the pressures in the control chamber 16 and the flow chamber 17 are otherwise nearly equal. The outlet 39 of the circuit in FIG. 2 is connected to the valving chamber or nozzle 19 of valve means 37, a restricted bleed 41 and a P-E switch 40.

In operation, assuming the PRV 30 is adjusted to allow valve means 35 to open when the branch pressure exceeds P2, and assuming the valve means 36 is adjusted to open when the pressure in the flow chamber of valve means 36 exceeds P1, as the branch pressure increases from zero it is transmitted through conduit 42 to the flow chamber 17 of valve means 37. Valve means 37 opens as soon as the light closing spring is overcome which is say, when the branch pressure exceeds 1 psi. The branch pressure is thereupon transmitted through valving chamber or nozzle 19 to the outlet 39. When the branch pressure reaches P2, valve means 35 is opened and branch pressure is transmitted through the valving chamber of valve means 35 to the outlet 22, the flow chamber of valve means 36 thereby causing valve means 36 to open, and to the control chamber of valve means 37 thereby causing valve means 37 to close. The output pressure at 39 thereupon drops to zero since the pressure at the outlet is bled to atmospheric pressure through restricted bleed 41. If the branch pressure thereafter begins to decrease, valve means 35 will close when the branch pressure falls below P2 but valve means 37 will remain closed since branch pressure is being transmitted through conduit 42 to valving chamber or nozzle 19 of valve means 36, through flow chamber of valve means 36, through conduit 43 to the control chamber of valve means 37. When the branch pressure falls below P1, valve means 36 will also close thereupon cutting off communication between the control chamber of valve means 37 and the branch pressure inlet 12. Valve means 37 is thereupon allowed to open and the pressure output again becomes equal to the branch pressure input. The output pressure at 39 of the circuit in FIG. 2 is shown in its relationship to the branch pressure input in FIG. 2*a*.

Figure 2A:
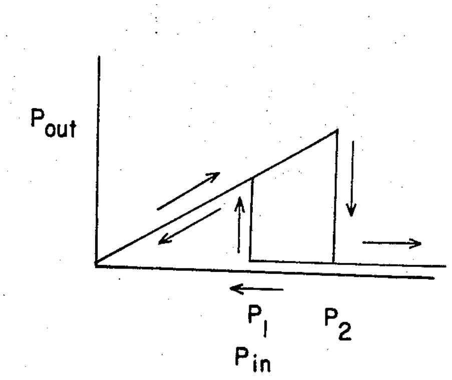
FIG. 2*a* is a graph illustrating the relationship between the branch pressure input and the pressure output of the switching circuit of FIG. 2.
Figure 3:
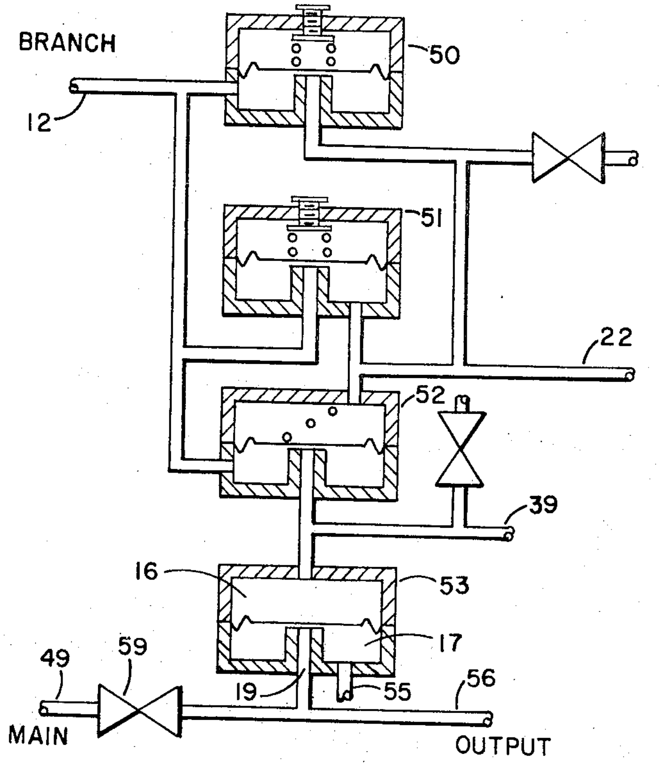
FIG. 3 is a schematic illustration of the switching circuit arranged to provide reverse acting switching of a main pressure input.
Figure 3A:
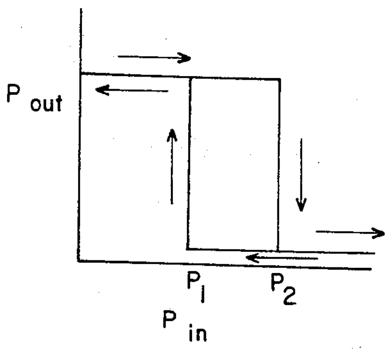
FIG. 3*a* is a graph illustrating the relationship between the branch pressure input and the pressure output of the switching circuit of FIG. 3.

The switching circuit illustrated in FIG. 3 provides a reverse acting switching of a main pressure conduit 49. Valve means 50, 51, and 52 are essentially the same as valve means 35, 36, and 37 in FIG. 2 with the exception that an adjustable spring is used in valve means 50 in place of the PRV illustrated in FIG. 2. Essentially the only distinction between the switching circuit of FIG. 3 and that of FIG. 2 is that one additional diaphragm logic module or valve means 53 is added with its control chamber connected to the outlet 39. Connected to the valving chamber or nozzle of valve means 53 is a main pressure conduit 49. A restriction 59 is included in the main pressure conduit upstream of the connection to the valving chamber or nozzles of valve means 53. If valve means 50 and 51 are arranged to open respectively when the branch pressure reaches P2 in the flow chamber of valve means 50 and when the pressure in the flow chamber of valve means 51 reaches P1, then the outlet 39, if utilized, will provide the second pressure output whose relationship to the branch pressure input is shown in FIG. 2*a*. Likewise the output at 22 of the circuit in FIG. 3, if outlet 22 is utilized, will be the same as the output whose relationship to the branch pressure input is shown in FIG. 1*a*. Thus branch pressure iill be transmitted to the control chamber 16 of valve means 53 until the branch pressure reaches P2. Thereupon, communication between the branch pressure inlet 12 and the control chamber 16 of valve means 53 will be cut off and the main pressure in valving chamber or nozzle 19 of valve means 53 will cause valve means 53 to open. Main pressure will thereupon be bled to atmosphere through the valving chamber 53 and out through a port 55 connected to the flow chamber 17 of valve means 53. Thus the output at 56 of the circuit in FIG. 3 is equal to main pressure until the branch pressure reaches P2. Thereupon the output drops to zero and remains at zero until the branch pressure falls below P1 whereupon the output pressure goes back to main pressure.

Again the output pressures at 22 and 39 in the circuit of FIG. 3 may or may not be utilized although if they are not, the outlet 22 and 39 should be plugged.

Figure 4:
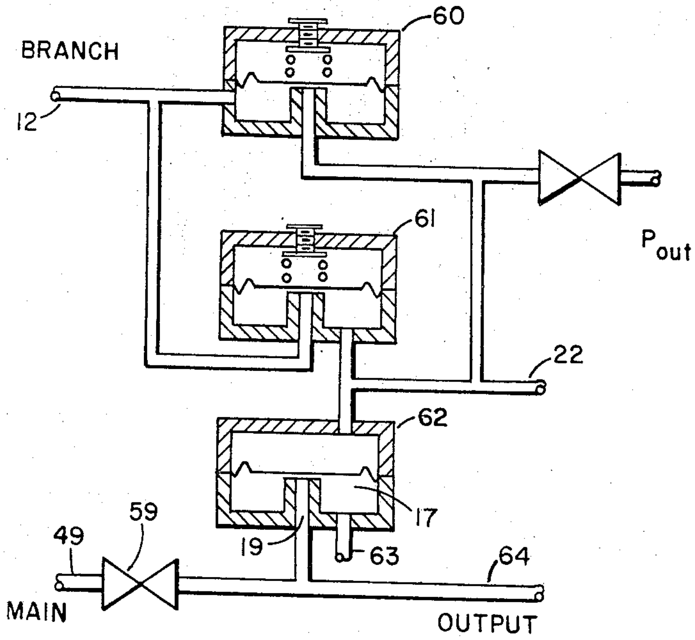
FIG. 4 is a schematic illustration of the switching circuit arranged to provide direct acting switching of a main pressure input.
Figure 4A:
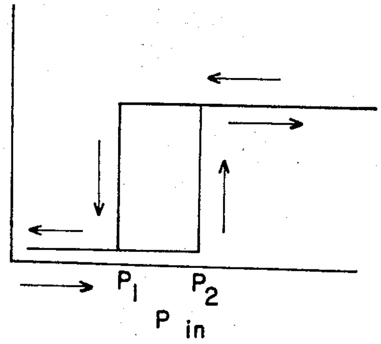
FIG. 4*a* is a graph illustrating the relationship between the branch pressure input and the pressure output of the switching circuit of FIG. 4.

The switching circuit of FIG. 4 provides a direct switching of a main pressure conduit 49. Valve means 60 and 61 of FIG. 4 are interconnected in the same fashion as valve means 10 and 11 of FIG. 1 and are assumed to be adjusted to like setpoints P2 and P1 respectively. The output at 22 of the circuit in FIG. 4 is therefore the same as the pressure output at 22 of the circuit in FIG. 1. All that is added in FIG. 4 to the switching circuit of FIG. 1 is valve means 62, the control chamber of which is connected to the outlet 22. As in FIG. 3, a main pressure conduit, is connected through a restriction 59 to the valving chamber or nozzle 19 of valve means 62. As shown in FIG. 1a, the output at 22 is zero until the branch pressure reaches P2. Accordingly valve means 62, being unpressurized in its control chamber, is allowed to be open and the main pressure conduit is bled to atmosphere through a port 63 in the flow chamber 17 of valve means 62. When the branch pressure reaches P2, the branch pressure is transmitted to the outlet 22 and therefore to the control chamber of valve means 62. Thus, valve means 62 is caused to close and the output pressure at 64 immediately increases to main pressure. The output at 64 remains at main pressure until the branch pressure falls below P1 at which time valve means 62 again opens and main pressure is bled to atmosphere through port 63.

While various references have been made herein to specific uses of the subject switching circuit, it is intended that the scope of the invention be limited only by the scoee of the appended claims.

The embodiments of the invention in which an exclusive property or right is claimed are defined as follows:

1. A diaphragm logic switching circuit comprising:

a branch pressure inlet;

first means adapted to provide a first pressure output having a first relationship with the branch pressure;

first and second valve means each comprising housing means, diaphragm means dividing the housing means into a control chamber and flow chamber, nozzle means disposed within the flow chamber and arranged to sealably cooperate with the diaphragm means, and biasing means associated with the control chamber to urge the diaphragm means against said nozzle means;

the branch pressure inlet being connected to the flow chamber of the first valve means and the nozzle means of the second valve means;

the first means connected to the nozzle means of the first valve means and the flow chamber of the second valve means.

2. The invention according to claim 1 wherein the biasing means is adjustable in at least one of the first and second valve means.

3. The invention according to claim 1 additionally comprising a restricted bleed means connected to the nozzle means of the first valve means.

4. The invention according to claim 3 wherein the biasing means in the first and second valve means comprises adjustable spring means.

5. The invention according to claim 1 additionally comprising:

second means adapted to provide a second pressure output having a second relationship with the branch pressure;

third valve means comprising housing means, diaphragm means dividing the housing means into a control chamber and a flow chamber, nozzle means disposed within the flow chamber and arranged to sealably cooperate with the diaphragm means;

the branch pressure inlet being further connected to the flow chamber of the third valve means;

the second means being connected to the nozzle means of the third valve means;

the control chamber of the third valve means being connected to the first means.

6. The invention according to claim 5 additionally comprising restricted bleed means connected to the nozzle means of the first valve means and wherein the biasing means comprises adjustable spring means.

7. The invention according to claim 5 additionally comprising:

a main pressure inlet;

a main pressure outlet;

fourth valve means comprising housing means, diaphragm means dividing the housing means into a control chamber and a flow chamber, and nozzle means disposed within the flow chamber and arranged to sealably cooperate with the diaphragm means;

the main pressure inlet and main pressure outlet being connected to the nozzle means of the fourth valve means; and, the control chamber of the fourth valve means being connected to the second means.

8. The invention according to claim 7 additionally comprising a restriction in the main pressure inlet upstream of the connection between the main pressure inlet and the nozzle means of the fourth valve means, and restricted bleed means connected to the nozzle means of the first and third valve means, the flow chamber of the fourth valve means being in communication with the atmosphere, the biasing means comprising adjustable spring means.

9. The invention according to claim 1 additionally comprising:

a main pressure inlet;

a main pressure outlet;

third valve means comprising housing means, diaphragm means dividing the housing means into a control chamber and a flow chamber, nozzle means disposed within the flow chamber and arranged to sealably cooperate with the diaphragm means;

the main pressure inlet and the main pressure outlet being connected to the nozzle means of the third valve means; and, the control chamber of the third valve means being connected to the first means.

10. The invention according to claim 9 additionally comprising a restriction in the main pressure inlet upstream of the connection between the main pressure inlet and the nozzle means of the third valve means, and a restricted bleed means connected to the nozzle means of the first valve means, the biasing means comprising adjustable spring means, the flow chamber of the third valve means being in communication with the atmosphere.

* * * * *